United States Patent Office 3,388,191
Patented June 11, 1968

3,388,191
PHOSPHATE SALT OF REACTION PRODUCT OF DICARBOXYLIC ACID, ANHYDRIDE OR ESTER AND ALKANOLAMINE
Henryk A. Cyba, Evanston, Ill., assignor to Universal Oil Products Company, Des Plaines, Ill., a corporation of Delaware
No Drawing. Filed Apr. 5, 1965, Ser. No. 445,789
14 Claims. (Cl. 260—925)

ABSTRACT OF THE DISCLOSURE

Salt of a phosphorus compound selected from the group consisting of phosphate, phosphinate, phosphonate and thio derivatives thereof with the reaction product, formed at a temperature of 175°–500° F., of one mole proportion of a compound selected from the group consisting of polyhalopolyhydropolycyclicdicarboxylic acid, anhydride and ester thereof with from one to two mole proportions of an alkanolamine containing only one each of hydroxyl and amino groups. The compounds are useful as additives for lube oils and greases.

This application relates to a novel composition of matter comprising a phosphate salt of the reaction product of a particular type of dicarboxylic acid or derivative thereof with an alkanolamine.

In my copending application Ser. No. 330,007, filed Dec. 12, 1963, now U.S. Patent No. 3,331,892 issued July 18, 1967. I have disclosed a novel addition reaction product of phosphate with a polymeric reaction product of the particular type of dicarboxylic acid or derivative thereof and an alkanolamine containing at least two hydroxyl and one amino groups or at least one hydroxyl and two amino groups. These addition reaction products are useful as additives to organic substances and particularly lubricating compositions comprising a major proportion of an oil of lubricating viscosity. The present application is based on the discovery that novel compositions of matter also are obtained by forming a phosphate salt of the reaction product of the particular type of dicarboxylic acid or derivative thereof and an alkanolamine which contains only one each of hydroxyl and amino groups. These salts also are effective additives for organic substances and particularly lubricating compositions.

In a preferred embodiment the alkanolamine for use as a reactant in the present invention is an N,N-disubstituted alkanolamine. It will be noted that such an alkanolamine contains a reactive hydroxyl group which will react with the carboxylic acid or derivative to form an ester. However, the substituent groups on the nitrogen atom of the alkanolamine preclude further reaction of the nitrogen atom with the dicarboxylic acid or derivative and thereby precludes the formation of a polymeric reaction product as occurs when the alkanolamine contains three reactive sites as in the case of the addition reaction products of the previously filed application for patent. The reaction product of the dicarboxylic acid or derivative thereof and the N,N-di-substituted alkanolamine will contain basic nitrogen and thereby permits the formation of the novel phosphate salt of the present application.

In one embodiment the present invention relates to a salt of a phosphate selected from the group consisting of alkyl phosphate, alkyl phosphinate, alkyl phosphonate and their thio derivatives with the reaction product of a compound selected from the group consisting of polyhalopolyhydropolycyclicdicarboxylic acid, anhydride and ester of said acid with an alkanolamine. In a preferred embodiment the alkanolamine comprises an N,N-di-substituted alkanolamine.

In another embodiment the present invention relates to the use of the salt as an additive in organic substances including hydrocarbon oils, particularly lubricants, and plastics especially those requiring flame-proofing properties.

Any suitable alkylphosphate is used in preparing the salt of the present invention and includes both the alkyl acid orthophosphates and the alkyl acid pyrophosphates. In the alkyl acid orthophosphates, the monoalkyl ester, dialkyl ester or a mixture thereof may be employed. In the alkyl acid pyrophosphates, the monoalkyl ester, dialkyl ester, trialkyl ester or mixtures thereof may be employed, the dialkyl esters being preferred and the ester groups may be attached to the same or different phosphorus atom. Generally, however, this compound will be symmetrical and, accordingly, the alkyl ester groups will be attached to different phosphorus atoms.

In a preferred embodiment the alkyl phosphate contains at least one alkyl group of at least six carbon atoms and more particularly from about six to about twenty or more carbon atoms. Illustrative preferred alkyl acid orthophosphates include monohexyl acid orthophosphate, dihexyl acid orthophosphate, mixture of mono- and dihexyl acid orthophosphates, monoheptyl acid orthophosphate, diheptyl acid orthophosphate, mixture of mono- and diheptyl acid orthophosphates, monooctyl acid orthophosphate, dioctyl acid orthophosphate, mixture of mono- and dioctyl acid orthophosphates, mononyl acid orthophosphate, dinonyl acid orthophosphate, mixture of mono- and dinonyl acid orthophosphates, monodecyl acid orthophosphate, didecyl acid orthophosphate, mixture of mono- and didecyl acid orthophosphates, monoundecyl acid orthophosphate, diundecyl acid orthophosphate, mixture of mono- and diundecyl acid orthophosphates, monododecyl acid orthophosphate, didodecyl acid orthophosphate, mixture of mono- and didodecyl acid orthophosphates, monotridecyl acid orthophosphate, ditridecyl acid orthophosphate, mixture of mono- and ditridecyl acid orthophosphates, monotetradecyl acid orthophosphate, ditetradecyl acid orthophosphate, mixture of mono- and ditetradecyl acid orthophosphates, monopentadecyl acid orthophosphate, dipentadecyl acid orthophosphate, mixture of mono- and dipentadecyl acid orthophosphates, monohexadecyl acid orthophosphate, dihexadecyl acid orthophosphate, mixture of mono- and dihexadecyl acid orthophosphates, monoheptadecyl acid orthophosphate, diheptadecyl acid orthophosphate, mixture of mono- and diheptadecyl acid orthophosphates, monooctadecyl acid orthophosphate, dioctadecyl acid orthophosphate, mixture of mono- and dioctadecyl acid orthophosphates, mononadecyl acid orthophosphate, dinonadecyl acid orthophosphate, mixture of mono- and dinonadecyl acid orthophosphates, monoeicosyl acid orthophosphate, dieicosyl acid orthophosphate, mixture of mono- and dieicosyl acid orthophosphates, etc. In another embodiment the alkyl group or groups are selected from methyl, ethyl, propyl, butyl and pentyl. It is understood that a mixture of the phosphates having alkyl groups of different chain lengths may be employed. Although alkyl groups are preferred aryl or alkaryl groups may be used successfully where such use is warranted or preferred.

Preferred alkyl acid pyrophosphates include monohexyl acid pyrophosphate, dihexyl acid pyrophosphate, mixture of mono- and dihexyl acid pyrophosphates, monoheptyl acid pyrophosphate, diheptyl acid pyrophosphate, mixture of mono- and diheptyl acid pyrophosphates, monooctyl acid pyrophosphates, dioctyl acid pyrophosphate, mixture of mono- and dioctyl acid pyrophosphates, mononyl acid pyrophosphate, dinonyl acid pyrophosphate, mixture of mono- and dinonyl acid pyrophosphates, monodecyl acid pyrophosphate, didecyl acid pyrophosphate, mixture of mono- and didecyl acid pyrophosphates, monoundecyl acid pyrophosphate, diundecyl acid pyrophosphate, mixture of mono- and diundecyl acid pyrophosphates, monododecyl acid pyrophosphate, didodecyl acid pyrophosphate, mixture of mono- and didodecyl acid pyrophosphates, monotridecyl acid pyrophosphate, ditridecyl acid pyrophosphate, mixture of mono- and ditridecyl acid pyrophosphates, monotetradecyl acid pyrophosphate, ditetradecyl acid pyrophosphate, mixture of mono- and ditetradecyl acid pyrophosphates, monopentadecyl acid pyrophosphate, dipentadecyl acid pyrophosphate, mixture of mono- and dipentadecyl acid pyrophosphates, monohexadecyl acid pyrophosphate, dihexadecyl acid pyrophosphate, mixture of mono- and dihexadecyl acid pyrophosphates, monoheptadecyl acid pyrophosphate, diheptadecyl acid pyrophosphate, mixture of mono- and diheptadecyl acid pyrophosphates, monooctadecyl acid pyrophosphate, dioctadecyl acid pyrophosphate, mixture of mono- and dioctadecyl acid pyrophosphates, monononadecyl acid pyrophosphate, dinonadecyl acid pyrophosphate, mixture of mono- and dinonadecyl acid pyrophosphates, monoeicosyl acid pyrophosphate, dieicosyl acid pyrophosphate, mixture of mono- and dieicosyl acid pyrophosphates, etc. In another embodiment the alkyl group or groups are selected from methyl, ethyl, propyl, butyl and pentyl. It is understood that a mixture of the phosphates having alkyl groups of different chain lengths may be employed. Also, aryl and alkaryl groups may be used in some cases.

Another phosphate for use in preparing the addition reaction product is prepared by the oxyalkylenation of an alcohol, which may be of aliphatic or aromatic configuration, and then forming the phosphate thereof. Aliphatic alcohols for oxyalkylenation may be saturated or unsaturated and preferably contain at least four carbon atoms and more particularly from about six to twenty or more carbon atoms. Illustrative alcohols include butyl alcohol, pentyl alcohol, hexyl alcohol, heptyl alcohol, octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, nonadecyl alcohol, eicosyl alcohol, etc. These alcohols conveniently are derived from fatty acids and accordingly include, for example, lauryl alcohol, myristyl alcohol, palmityl alcohol, stearyl alcohol, decylenyl alcohol, dodecylenyl alcohol, palmitoleyl alcohol, oleyl alcohol, linoleyl alcohol, linolenyl alcohol, gadoleyl alcohol, etc.

Aromatic acohols include phenol and particularly alkylphenols. The alkylphenols preferably contain at least four and more particularly from about six to about twenty carbon atoms in the alkyl group. Illustrative alkylphenols include hexylphenol, heptylphenol, octylphenol, nonylphenol, decylphenol, undecylphenol, dodecylphenol, tridecylphenol, tetradecylphenol, pentadecylphenol, hexadecylphenol, heptadecylphenol, octadecylphenol, nonadecylphenol, eicosylphenol, etc., as well as dialkyl and trialkylphenols in which the alkyl groups are selected from those hereinbefore specifically set forth. Also, the polyalkylphenols may contain one or more alkyl groups containing from one to six carbon atoms and one or more alkyl groups containing from six to twenty carbon atoms.

Oxyalkylenation of the aliphatic or aromatic alcohol is effected in any suitable manner. While ethylene oxide is preferred for reaction with the aliphatic or aromatic alcohol, it is understood that propylene oxide, butylene oxide, pentylene oxide, hexylene oxide, etc., may be used. The oxyalkylenation is effected by reacting the aliphatic or aromatic alcohol with the alkylene oxide, particularly ethylene oxide, in the molar ratios to produce the oxyalkylenated alcohol or phenol containing the oxyalkylenated group in the desired proportion. In a preferred embodiment, the oxyalkylenated alcohol or phenol contains from two to about twelve or more and particularly from two to about six oxyalkylene groups. The oxyalkylenation is effected in any suitable manner and generally will be conducted at a temperature of from ambient to about 350° F. and more particularly from about 200° to about 300° F., preferably in the presence of a catalyst such as sodium hydroxide, potassium hydroxide, tertiary amine, quaternary hydroxide, etc. When the oxyalkylenation is to be limited to the addition of one oxy group, the catalyst is used with the alkanols but may be omitted with the alkylphenols. Superatmospheric pressure may be employed and may be within the range of from about 10 to 1000 pounds or more.

The oxyalkylenated aliphatic or aromatic alcohol then is reacted in any suitable manner with $P_2O_5$ to form the desired phosphate. One molar proportion of $P_2O_5$ or other suitable phosphorus oxide is reacted per one or two molar proportions of the oxyalkylenated hydrocarbon. In general, an excess of $P_2O_5$ is employed in order to insure complete reaction. The reaction is effected at a temperature within the range of from ambient to about 250° F. and under substantially anhydrous conditions. The resultant free acid form of the phosphate generally is recovered as a viscous liquid.

Another embodiment of the invention comprises the alkylthiophosphate salt. Illustrative preferred dialkyl-dithiophosphates include monohexyl-dithiophosphate, dihexyl-dithiophosphate, mixture of mono- and dihexyl-dithiophosphate, monoheptyl - dithiophosphate, diheptyl - dithiophosphate, mixture of mono- and diheptyl - dithiophosphate, monooctyl - dithiophosphate, dioctyl - dithiophosphate, mixture of mono- and dioctyl - dithiophosphate, monononyl - dithiophosphate, dinonyl - dithiophosphate, mixture of mono- and dinonyl - dithiophosphate, mono - decyl - dithiophosphate, didecyl - dithiophosphate, mixture of mono- and didecyl - dithiophosphate, monoundecyl - dithiophosphate, diundecyl - dithiophosphate, mixture of mono- and diundecyl - dithiophosphate, monododecyl - dithiophosphate, didodecyl - dithiophosphate, mixture of mono- and didodecyl - dithiophosphate, mono - tridecyl - dithiophosphate, ditridecyl - dithiophosphate, mixture of mono- and ditridecyl - dithiophosphate, monotetradecyl-dithiophosphate, ditetradecyl-dithiophosphate, mixture of mono- and ditetradecyl - dithiophosphate, monopentadecyl - dithiophosphate, dipentadecyl - dithiophosphate, mixture of mono- and dipentadecyl - dithiophosphate, monohexadecyl-dithiophosphate, dihexadecyl - dithiophosphate, mixture of mono- and dihexadecyl - dithiophosphate, monoheptadecyl - dithiophosphate, diheptadecyl - dithiophosphate, mixture of mono- and diheptadecyl-dithiophosphate, monooctadecyl-dithiophosphate, dioctadecyl - dithiophosphate, mixture of mono- and dioctadecyl - dithiophosphate, monononadecyl - dithiophosphate, dinonadecyl - dithiophosphate, mixture of mono- and dinonadecyl - dithiophosphate, monoeicosyl - dithiophosphate, dieicosyl - dithiophosphate, mixture of mono- and dieicosyl - dithiophosphate, etc.

The oxyalkylenated aliphatic or aromatic alcohol dithiophosphates are prepared in substantially the same manner as hereinbefore set forth for the oxyalkylenated aliphatic or aromatic alcohol phosphates, except that $P_2S_5$ or other suitable phosphorus sulfide is used instead of the phosphorus oxide. Illustrative preferred oxyalkylenated alkylphenol dithiophosphates include di - (oxyethylenated hexylphenol) - dithiophosphate containing from one to fifteen oxyethylene groups, di - (oxyethylenated dihexylphenol) - dithiophosphate containing from one to fifteen oxyethylene groups, di - (oxyethylenated heptylphenol)- dithiophosphate containing from one to fifteen oxyethylene groups, di - (oxyethylenated diheptylphenol) - dithiophosphate containing from one to fifteen oxyethylene groups, di - (oxyethylenated octylphenol) - dithiophosphate containing from one to fifteen oxyethylene groups, di - (oxyethylenated dioctylphenol) - dithiophosphate containing from one to fifteen oxyethylene groups, di-(oxyethylenated nonylphenol) - dithiophosphate containing from one to fifteen oxyethylene groups, di-(oxyethylenated dinonylphenol)-dithiophosphate containing from one to fifteen oxyethylene groups, di-(oxyethylenated decylphenol)-dithiophosphate containing from one to fifteen oxyethylene groups, di-(oxyethylenated didecylphenol)-dithiophosphate containing from one to fifteen oxyethylene groups, di-(oxyethylenated undecylphenol)-dithiophosphate containing from one to fifteen oxyethylene groups, di-(oxyethylenated diundecylphenol)-dithiophosphate containing from one to fifteen oxyethylene groups, di-(oxyethylenated dodecylphenol)-dithiophosphate containing from one to fifteen oxyethylene groups, di-(oxyethylenated didodecylphenol)-dithiophosphate containing from one to fifteen oxyethylene groups, etc. It is understood that the corresponding mono-oxyalkylenated alkylphenol dithiophosphate or the corresponding oxyalkylenated alkylphenol monothiophosphate may be used. It also is understood that the corresponding oxyalkylenated compounds in which the oxyalkylene groups contain from three to eight or more carbon atoms may be used. As used in the present specification and claims, it is understood that the number of oxyalkylene groups means the number thereof per each alkylphenyl group or each alkyl group derived from the aliphatic alcohol.

Although alkyl or dialkyl phosphoric, phosphonic or phosphinic acids and their thio analogs are preferred, in some cases aryl or alkaryl or polyalkaryl phosphoric, phosphonic or phosphinic acids can be used. It is understood that the alkyl or aryl groups may be substituted by halogen, especially chlorine. Such a substitution is preferred for flame-proofing of plastics and resins or extreme pressure formulating of oils.

As hereinbefore set forth, the phosphate or thiophosphate is reacted with the reaction product of certain acids or derivatives thereof and alkanolamines. The acid or anhydride for use in the present invention is a polyhalopolyhydropolycyclicdicarboxylic acid or anhydride thereof. Any suitable acid or anhydride meeting these requirements is used in accordance with the present invention. In one embodiment the acid or anhydride is of the type known in the art as "Chlorendic" or "HET" acid or anhydride. This acid is prepared by the Diels-Alder addition reaction of maleic acid and hexachlorocyclopentadiene. The corresponding anhydride is prepared by the reaction of maleic anhydride and hexachlorocyclopentadiene. The acid or anhydride also may be named 1,4,5,6,7,7-hexachlorodicyclo - (2.2.1) - 5 - heptene - 2,3 - dicarboxylic acid or the corresponding anhydride. These compounds are prepared by the reaction of equal molar quantities of the reactants, generally by refluxing in the presence of a solvent. These reactions are well known in the art and are described, for example, in U.S. Patent 2,606,910 and elsewhere.

In place of maleic acid or maleic anhydride, it is understood that other suitable dicarboxylic acids containing carbon to carbon unsaturation may be employed. Illustrative examples include fumaric acid, itaconic acid, citraconic acid, glutaconic acid, etc. Also, in place of hexachlorocyclopentadiene, other suitable halo-substituted cycloalkadienes may be used. Illustrative examples include 1,2 - dichlorocyclopentadiene, 1,5 - dichlorocyclopentadiene, 1,2,3 - trichlorocyclopentadiene, 1,2,3,4 - tetrachlorocyclopentadiene, 1,2,3,4,5 - pentachlorocyclopentadiene and similar compounds in which all or part of the chlorine is replaced by other halogen and particularly bromine.

A particularly preferred polyhalopolyhydropolycyclicdicarboxylic acid or anhydride is preferred by the Diels-Alder condensation of a conjugated aliphatic diene with an olefinic dicarboxylic acid and then further condensing the resultant cyclohexenedicarboxylic acid with a halocycloalkadiene. A specifically preferred reaction product is the Diels-Alder condensation of 1,3-butadiene with maleic acid to form 1,2,3,6 - tetrahydrophthalic acid, followed by the Diels-Alder condensation with hexachlorocyclopentadiene. The product may be named 5,6,7,8,9,9- hexachloro - 1,2,3,4,4a,5,8,8a - octahydro - 5,8 - methano-2,3 - naphthalenedicarboxylic acid, hereinafter referred to as "A" acid. The corresponding anhydride is prepared starting with maleic anhydride instead of maleic acid. The anhydride may be named 5,6,7,8,9,9 - hexachloro - 1,2,3,4,4a,5,8,8a - octahydro - 5,8 - methano - 2,3-naphthalenedicarboxylic anhydride, hereinafter referred to as "A" anhydride. Here again, other conjugated aliphatic dienes may be used including, for example, 2 - methyl - 1,3 - butadiene, 1,3 - pentadiene, 1,3 - hexadiene, 2,4-hexadiene, 2,3 - dimethyl - 1,3 - butadiene, 1,3 - heptadiene, 2,4 - heptadiene, conjugated nonadienes, etc., halodienes, as for example, chloroprene and particularly 1 - chlorobutadiene and 1,4 - dichlorobutadiene. Similarly, other unsaturated dicarboxylic acids may be used including fumaric acid, itaconic acid, citraconic acid, glutaconic acid, mesaconic acid, etc. Also, other halocycloalkadienes may be used including, for example, those specifically hereinbefore set forth. The preparation of these compounds also is known in the art and is set forth in detail in U.S. Patent 3,017,431.

Still another preferred polyhalopolyhydropolycyclicdicarboxylic acid or anhydride is prepared by condensing cyclopentadiene with maleic acid or maleic anhydride to form norborn - 5 - ene - 2,3 - dicarboxylic acid or anhydride and then condensing the same with hexachlorocyclopentadiene. The product may be named 5,6,7,8,9,9-hexachloro - 1,2,3,4,4a,5,8,8a - octahydro - 1,4,5,8 - dimethano - 2,3 - naphthalenedicarboxylic acid or anhydride, hereinafter referred to as "B" acid and "B" anhydride respectively. Here again, it is understood that other conjugated cycloaliphatic dienes, other unsaturated dicarboxylic acids or anhydrides and other polyhalocycloalkadienes may be used to prepare suitable polyhalopolyhydropolycyclicdicarboxylic acids or anhydrides.

From the above, it will be seen that any suitable polyhalopolyhydropolycyclicdicarboxylic acid or anhydride may be used in accordance with the present invention. The polyhalopolyhydropolycyclicdicarboxylic acid may be illustrated by the following general structure:

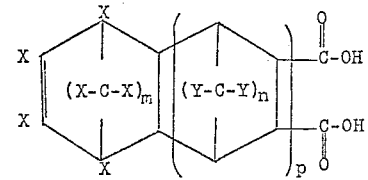

in which X is selected from the group consisting of halogen and particularly chlorine and/or bromine, hydrogen and an alkyl radical of from one to ten and preferably from one to four carbon atoms, at least two of the X's being halogen, Y is selected from the group consisting of halogen, hydrogen and an alkyl radical of one to ten and preferably from one to four carbon atoms, $m$ is an integer of from one to four, $n$ ranges from zero to four and $p$ ranges from zero to four.

The above structure illustrates the dicarboxylic acid. In the interest of simplicity, the corresponding anhydride is not being illustrated, but is readily ascertainable from the above structure.

Referring to the above structure, when X is chlorine, $m$ is one, $n$ is zero and $p$ is zero, the compound is 1,4,5,6,7,7-hexachloro-(2.2.1)-5-heptene-2,3-dicarboxylic acid or the corresponding anhydride. Similarly, when X is chlorine, $m$ is one, $n$ is zero and $p$ is one, the compound is 5,6,7,8,9,9-hexachloro-1,2,3,4,4a,5,8,8a-octahydro-5,8-methano-2,3-naphthalenedicarboxylic acid or the corresponding anhydride. Also, when X is chlorine, Y is hydrogen, $m$ is one, $n$ is one and $p$ is one, the compound is 5,6,7,8,9,9-hexachloro-1,2,3,4,4a,5,8,8a-octahydro-1,4,5,8-dimethano-2,3-naphthalenedicarboxylic acid or the corresponding anhydride.

While the particular acid or anhydride set forth above is preferred, it is understood that an ester of the acid may be used for reacting with the alkanolamine. Any suitable ester may be used and is prepared by reacting the acid with a lower alcohol under conditions to liberate alcohol. By lower alcohol I mean an alcohol containing from one to four carbon atoms and thus includes methanol, ethanol, propanol and butanol. In subsequent reaction with the alkanolamine, transesterification occurs to form a new ester.

As hereinbefore set forth, the dicarboxylic acid, anhydride or ester is reacted with an alkanolamine. In a preferred embodiment the alkanolamine is an N,N-di-substituted alkanolamine. Preferred alkanolamines comprise N,N-di-aliphatic-alkanolamines in which the aliphatic groups contain from one to about 50 carbon atoms and preferably from one to about 20 carbon atoms. In a particularly preferred embodiment, both aliphatic groups are the same as illustrated in compounds as N,N-dimethyl-ethanolamine,
N,N-diethyl-ethanolamine,
N,N-dipropyl-ethanolamine,
N,N-dibutyl-ethanolamine,
N,N-dipentyl-ethanolamine,
N,N-dihexyl-ethanolamine,
N,N-diheptyl-ethanolamine,
N,N-dioctyl-ethanolamine,
N,N-dinonyl-ethanolamine,
N,N-didecyl-ethanolamine,
N,N-diundecyl-ethanolamine,
N,N-didodecyl-ethanolamine,
N,N-ditridecyl-ethanolamine,
N,N-ditetradecyl-ethanolamine,
N,N-dipentadecyl-ethanolamine,
N,N-dihexadecyl-ethanolamine,
N,N-diheptadecyl-ethanolamine,
N,N-dioctadecyl-ethanolamine,
N,N-dinonadecyl-ethanolamine,
N,N-dieicosyl-ethanolamine, etc.

In another embodiment the aliphatic substituents may be different as illustrated in compounds as N-methyl-N-ethyl-ethanolamine,
N-methyl-N-propyl-ethanolamine,
N-methyl-N-butyl-ethanolamine,
N-methyl-N-pentyl-ethanolamine,
N-methyl-N-hexyl-ethanolamine,
N-methyl-N-heptyl-ethanolamine,
N-methyl-N-octyl-ethanolamine,
N-methyl-N-nonyl-ethanolamine,
N-methyl-N-decyl-ethanolamine,
N-methyl-N-undecyl-ethanolamine,
N-methyl-N-dodecyl-ethanolamine, etc.,
N-ethyl-N-propyl-ethanolamine,
N-ethyl-N-butyl-ethanolamine,
N-ethyl-N-pentyl-ethanolamine,
N-ethyl-N-hexyl-ethanolamine,
N-ethyl-N-heptyl-ethanolamine,
N-ethyl-N-octyl-ethanolamine,
N-ethyl-N-nonyl-ethanolamine,
N-ethyl-N-decyl-ethanolamine, etc.,
N-propyl-N-butyl-ethanolamine,
N-propyl-N-pentyl-ethanolamine,
N-propyl-N-hexyl-ethanolamine,
N-propyl-N-heptyl-ethanolamine,
N-propyl-N-octyl-ethanolamine,
N-propyl-N-nonyl-ethanolamine,
N-propyl-N-decyl-ethanolamine, etc., it being understood that each of the aliphatic groups may contain from one to 20 or more carbon atoms each.

The specific compounds hereinbefore set forth are examples of N,N-di-aliphatic-ethanolamines. Other alkanolamines include the correspondingly substituted propanolamines, butanolamines, pentanolamines, hexanolamines, heptanolamines, octanolamines and higher alkanolamines. The carbon atoms in the propanolamine and higher alkanolamines may be straight or branched chain.

It is particularly preferred that the alkanolamine is an N,N-di-aliphatic-alkanolamine in which the aliphatic substituents are alkyl groups of from one to about 20 carbon atoms and include particularly the specific compounds hereinbefore set forth. However, in another embodiment, the aliphatic substituents may be alkenyl substituents. Illustrative compounds in this embodiment include N,N-dipropenyl-ethanolamine,
N,N-dibutenyl-ethanolamine,
N,N-dipentenyl-ethanolamine,
N,N-dihexenyl-ethanolamine,
N,N-diheptenyl-ethanolamine,
N,N-dioctenyl-ethanolamine,
N,N-dinonyl-ethanolamine,
N,N-didecenyl-ethanolamine,
N,N-diundecenyl-ethanolamine,
N,N-didodecenyl-ethanolamine,
N,N-ditridecenyl-ethanolamine,
N,N-ditetradecenyl-ethanolamine,
N,N-dipentadecenyl-ethanolamine,
N,N-dihexadecenyl-ethanolamine,
N,N-diheptadecenyl-ethanolamine,
N,N-dioctadecenyl-ethanolamine,
N,N-dinonadecenyl-ethanolamine,
N,N-dieicosenyl-ethanolamine, etc.

In another preferred embodiment the N,N-di-substituted alkanolamine comprises an N,N-dicycloalkyl alkanolamine. Illustrative compounds in this embodiment include N,N - dicyclopentyl-ethanolamine, N,N - dicyclohexyl-ethanolamine, etc., as well as compounds in which the cycloalkyl groups are different as, for example, N-cyclopentyl-N-cyclohexyl-ethanolamine, N - cyclopentyl-N-cycloheptyl-ethanolamine, N-cyclopentyl-N-cyclooctyl-ethanolamine, N-cyclopentyl-N-cyclononyl-ethanolamine, N-cyclopentyl-N-cyclodecyl-ethanolamine, etc., N-cyclohexyl-N-cycloheptyl-ethanolamine, etc. In still another embodiment the substituted alkanolamine contains one aliphatic and one cyclic group as illustrated in compounds as N-methyl-N-cyclopentyl-ethanolamine, N - methyl - N-cyclohexyl-ethanolamine, N-methyl - N - cycloheptyl-ethanolamine, N-methyl-N-cyclooctyl-ethanolamine, N-methyl-N-cyclodecyl-ethanolamine, N - methyl - N - cyclododecyl-ethanolamine, etc., N-ethyl-N-cyclohexyl - ethanolamine, N-ethyl-N-cycloheptyl-ethanolamine, N-propyl-N-cyclohexyl-ethanolamine, N-butyl-N-cyclohexyl-ethanolamine, N-amyl - N - cyclohexyl-ethanolamine, etc. Here again, it is understood that the alkanolamine may comprise correspondingly substituted propanolamines, butanolamines, pentanolamines, hexanolamines and higher alkanolamines.

In still another embodiment the substituents are aryl as illustrated by N,N-diphenyl-ethanolamine, N,N-di-tolyl-ethanolamine, N,N - dixylyl - ethanolamine, N,N-diethylphenyl-ethanolamine, N,N-dipropylphenyl-ethanolamine, N,N - dibutylphenyl-ethanolamine, N,N - dinaphthyl-ethanolamine, N,N-dimethylnaphthyl-ethanolamine, N,N-diethylnaphthyl-ethanolamine, etc., as well as compounds containing different aryl substituents as illustrated by N-phenyl-N-tolyl-ethanolamine, N-phenyl-N-xylyl-ethanolamine, N-phenyl-N-ethylphenyl-ethanolamine, N-phenyl-N-propylphenyl-ethanolamine, N-phenyl-N-butylphenyl-ethanolamine, etc., N - tolyl - N - xylyl-ethanolamine, N-xylyl-N-ethylphenyl-ethanolamine, N-xylyl-N-propylphenyl-ethanolamine, etc. In still another embodiment the alkanolamine may include both an aliphatic and an aryl substituent as illustrated in compounds as N-methyl-N-phenyl-ethanolamine, N-methyl-N-tolyl-ethanolamine, N-methyl-N-xylyl-ethanolamine, N-methyl-N-naphthyl-ethanolamine, N-ethyl-N-phenyl-ethanolamine, N - ethyl-N-tolyl-ethanolamine, N-ethyl-N-xylyl-ethanolamine, N-propyl-N-phenyl-ethanolamine, N-propyl-N-tolyl-ethanolamine, N-propyl-N-xylyl-ethanolamine, N-butyl-N-phenyl-ethanolamine, N-butyl-N-tolyl-ethanolamine, N-butyl-N-xylylethanolamine, etc. Here again, it is understood that the alkanolamine may comprise the correspondingly substituted propanolamines, butanolamines, pentanolamines, hexanolamines and higher alkanolamines.

It will be noted that a number of different N,N-di-substituted alkanolamines may be used for reaction with the dicarboxylic acid or derivative. It is understood that the different alkanolamines are not necessarily equivalent but all of them will form novel and useful compounds. In still another embodiment N-substituted alkanolamines may be employed in which the substituent is selected from the aliphatic, cycloaliphatic or aryl groups hereinbefore set forth. In still another embodiment, the unsubstituted alkanolamine may be used. However, the use of the latter compounds probably will result in polymer formation and will be low in basic nitrogen. This, in turn, reduces the mole proportions of phosphate which will react with the polymer to form the salt. Accordingly, these phosphate salts generally will not be as effective. However, they may be suitable for certain uses and therefore are included within the broad scope of the present invention.

The alkanolamine is reacted with the polycarboxylic acid, anhydride or ester in any suitable manner. The reaction generally is effected at a temperature above about 175° F. and preferably at a higher temperature, which usually will not exceed about 500° F., although higher or lower temperatures may be employed under certain conditions. The exact temperature will depend upon whether a solvent is used and, when employed, on the particular solvent. For example, with benzene as the solvent, the temperature will be of the order of 175° F., with toluene the temperature will be of the order of 250° F., and with xylene the order of 300–320° F. Other preferred solvents include cumene, naphtha, decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in order to remove the water as it is formed. The time of reaction is sufficient to effect the desired reaction and, in general, will range from about two to about forty hours or more. Preferably one or two mole proportions of the alkanolamine are reacted per one mole proportion of the acid, anhydride or ester.

As hereinbefore set forth the reaction product of dicarboxylic acid and alkanolamine will comprise an ester. When a lower ester of the dicarboxylic acid is reacted with the alkanolamine, the product also will comprise a new ester formed by transesterification. When the alkanolamine is unsubstituted or contains only one substituent on the nitrogen atom, the reaction product probably will include polymers.

The phosphate, thiophosphate, phosphinate or phosphonate salt of the reaction product described above is prepared in any suitable manner. In general, the phosphate, thiophosphate, etc., is used in a proportion of from about 0.5 to about 2 acidic equivalents of phosphate or thiophosphate per one basic equivalent of the reaction product. The reaction conveniently is effected by intimately mixing the reactants at ambient temperature although, when desired, an elevated temperature may be employed. In general, the temperature will be within the range of from atmospheric to about 200° F. and, in some cases, up to 300° F., although temperatures outside of this range may be employed depending upon the specific reactants and solvent utilized. The mixing may be effected at atmospheric pressure or, when desired, under superatmospheric pressure which may be within the range of from about 5 to 100 pounds per square inch or more. The time of mixing and reacting will range from a fraction of an hour to twenty-four hours or more and generally from about one-quarter to about two hours. The reaction is an exothermic one and almost instantaneous, the time of mixing being determined more by the rate of addition of the ingredients and the geometry of the system than the rate of the reaction.

The reaction of the phosphate with the reaction product generally is exothermic and preferably is controlled by effecting the reaction in the presence of an inert solvent. Any suitable solvent may be employed, an aromatic hydrocarbon being particularly preferred. The aromatic hydrocarbons include benzene, toluene, xylene, ethylbenzene, cumene, decalin, tetralin, etc. Other solvents include saturated aliphatic esters as ethyl acetate, amyl acetate, 2-ethylhexyl acetate, methyl propionate, methyl butyrate, ethyl butyrate, isopropyl butyrate, etc., saturated aliphatic nitriles as acetonitrile, propionitrile, etc., dioxane, nitrobenzene, chlorobenzene, chloroform, carbon tetrachloride, etc. The reaction normally is effected in the absence of a catalyst.

The salt of the present invention generally is recovered as a viscous liquid or resinous product. It may be marketed and used as such or as a solution in a suitable solvent including, for example, saturated paraffinic hydrocarbons including pentane, hexane, heptane, octane, etc., aromatic hydrocarbons including benzene, toluene, xylene, cumene, etc., decalin, tetralin, alcohols, ketones, etc. However, when the product is recovered in the absence of a solvent or when the product is not sufficiently soluble in the substrate, the desired solubility may be obtained by dissolving the product in a mutual solvent. Suitable solvents for this purpose comprise phenols and particularly alkylphenols or polyalkylphenols in which the alkyl group or groups contain from six to twenty carbon atoms. The phenol may be used in a concentration of from about 1% and preferably from about 5% to about 500% by weight and, more particularly, from about 10% to about 200% by weight of the salt.

The salt of the present invention will have varied utility and is useful as an additive to organic substrates which undergo oxidative, thermal or other deterioration. The additive functions as a lubricity or extreme pressure agent, also as flame-proofing agent. In addition, the additive serves as a detergent-dispersant, peroxide decomposer, corrosion inhibitor, rust inhibitor, etc. Organic substrates include gasoline, naphtha, kerosene, jet fuel, lubricating oil, diesel fuel, fuel oil, residual oil, drying oil, grease, wax, resin, plastic, rubber, etc.

The salt of the present invention is advantageously used as an additive in lubricating oil. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other oils include those of animal, marine or vegetable origin.

The lubricating oils generally have a viscosity within the range of from 10 SUS at 100° F. to 1000 SUS at 210° F. (SAE viscosity numbers include the range from SAE 10 to SAE 160). The petroleum oils are obtained from paraffinic, naphthenic, asphaltic or mixed base crudes. When highly paraffinic lubricating oils are used, a solubilizing agent also is used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylolalkane esters such as the esters of trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., and particularly triesters in which the ester portions each contain from three to twelve carbon atoms and may be selected from those hereinbefore specifically set forth in connection with the discussion of the neopentyl glycol esters, (3) complex esters composed of dibasic acids and glycols, especially neopentyl, neohexyl, etc., glycols further reacted or capped with monobasic acids or alcohols to give lubricants of viscosities at 210° F. of from four to twelve centistokes or higher, and (4) tricresylphosphate, trioctylphosphate, trinonylphosphate, tridecylphosphate, as well as mixed aryl and alkyl phosphates, etc.

The preesnt invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

In another embodiment the salts of the present invention possess insecticidal properties with good inner therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The reaction products or mixtures of these may be used for the control of various larvae, mites, eggs of mites and such insects as flour bettle, Mexican bean beetle, black carpet beetle, milkweed bug, German cockroaches, southern army worms, mealy bug, sow bug, citrus red spider, greenhouse red spider, various mosquitoes, yellow fever mosquito, malarial mosquito, houseflies, etc.

As hereinbefore set forth, the salts of the present invention also possess flame-proofing or flame retardant properties and, therefore, are useful in plastics, coatings, paints, drying oils, etc., as well as in fibrous materials. For example, in textiles, the salt imparts flame retardant as well as fungicidal properties to the fabric.

The concentration of the salt to be employed as an additive will depend upon the particular substrate in which it is to be used. In general, the additive is used in a concentration of from about 0.001% to about 25% by weight of the substrate and more specifically within the range of from about 0.01% to about 5% by weight of the substrate. When used in conventional lubricating oil, the additive generally may be employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the additive of the present invention may be used along with other additives incorporated in the organic substrate. The other additives will depend upon the particular organic substrate. For example, in lubricating oil, the additional additives may comprise one or more of viscosity index improver, pour point depressor, anti-foam additive, detergent, corrosion inhibitor, additional antioxidant, etc. Preferred additional antioxidants are of the phenolic type and include tertiarybutylcatechol, 2,6-ditertiarybutyl-4-methylphenol, 2,4 - dimethyl-6-tertiarybutylphenol, etc., 2-tertiarybutyl-4-methoxyphenol, 2-tertiary-4-ethoxyphenol, 3,3',5,5' - tetratertiarybutyldihydroxydiphenylmethane, etc.

The salt of the present invention is an emulsifying agent and therefore will serve to emulsify water and oil of lubricating viscosity for use as lubricating oil, slushing oil, cutting oil, rolling oil, soluble oil, drawing compound, etc. When desired, an additional emulsifying agent may be employed. Any suitable emulsifying agent can be used, including alkali metal sulfonates of petroleum sulfonic acids, mahogany sulfonates, naphthenic acids, fatty acids, etc., fatty alcohol sulfonates, pentaerythritol oleates, laurates, etc. The amount of water used in the emulsified oils will depend upon the particular use of the emulsion and may range from 0.25% to 50% or even up to 98% by weight of the composition.

The additive of the present invention is incorporated in the substrate in any suitable manner and preferably the mixture is suitably agitated or otherwise mixed in order to obtain intimate admixing of the additive and of the substrate. When the substrate comprises a mixture of two or more components, the additive of the present invention may be commingled with one of the components prior to mixing with the remaining component or components of the substrate.

The following examples are introduced to illustrate further the novelty and utility of the present invention but not with the intention of unduly limiting the same.

Example I

The salt of this example was prepared by first forming the reaction product of 5,6,7,8,9,9-hexachloro-1,2,3,4,4a,5,8,8a-octahydro-5,8-methano - 2,3 - naphthalenedicarboxylic anhydride, herein referred to as "A" anhydride, with N,N-diethyl-ethanolamine and then reacting the resultant reaction product with mixed mono- and di-tridecyl acid orthophosphate. The reaction product was prepared by refluxing 106.25 g. (0.25 mole) of the "A" anhydride and 59 g. (0.5 mole) of N,N-diethyl-ethanolamine in the presence of 100 g. of toluene. Refluxing was continued for about 8 hours at a maximum temperature of about 250° F., during which time about 4.5 cc. of water was collected. Following completion of the reaction, the toluene solvent was removed by distillation under water pump vacuum at a temperature of about 340° F. The reaction product had a basic nitrogen equivalent of 2.97 meq./g. and a basic mole combining weight of 337, the latter corresponding to the theoretical mole combining weight of 319.

The salt was prepared by first dissolving 67.4 g. (0.05 mole) of the above reaction product in a commercial paraffinic oil in order to form a 50% solution for ease in handling and reacting. With mixing at room temperature, 18.65 g. (0.05 mole) of mixed mono- and di-tridecyl acid orthophosphate was added. The salt was recovered as a homogeneous solution in the paraffinic oil.

Example II

The bi-substituted salt of the reaction product, prepared as described in Example I, was prepared by mixing 67.4 g. (0.05 mole) of the 50% solution of the reaction product in the paraffinic oil, with 37.3 g. (0.1 mole) of the mixed mono- and di-tridecyl acid orthophosphate. The reaction was exothermic and the salt was recovered as a homogeneous solution in the paraffinic oil.

Example III

The salt of this example is prepared by reacting di-(oxyethylenated nonylphenol) phosphate, containing an average of 5 oxyethylene groups per each nonylphenyl group, with the reaction product prepared as described in Example I. The salt is prepared by mixing at room temperature 67.4 g. (0.05 mole) of the reaction product, prepared as described in Example I, with 111.7 g. (0.1 mole) of the di-(oxyethylenated nonylphenol) phosphate. The reaction is mildly exothermic. The use of two mole proportions of the phosphate per one mole proportion of the reaction product forms the bi-substituted salt.

Example IV

The corresponding mono-substituted salt of that prepared according to Example III is prepared by reacting equal mole proportions of the reaction product and the phosphate. Accordingly, 67.4 g. (0.05 mole) of the reaction product is mixed and reacted with 55.8 g. (0.05 mole) of the di-(oxyethylenated nonylphenol) phosphate.

Example V

The salt of this example was prepared by reacting di-(oxyethylenated nonylphenol) phosphate, containing an average of 4 oxyethylene groups per each nonylphenyl group, with the reaction product of "A" anhydride and N,N-dicyclohexyl-ethanolamine. The reaction product was prepared by gradually adding over a period of 15 minutes, with stirring at room temperature, 425 g. (one mole) of "A" anhydride to a solution of 450 g. (two moles) of N,N-dicyclohexyl-ethanolamine dissolved in one liter of toluene. The reaction was mildly exothermic, the temperature rising to about 100° F. The reaction mixture was then heated to about 240° F. for one hour, during which time some water and toluene were liberated. About one liter of xylene then was added in increment portions and the mixture was heated and refluxed at 293° F. for several days, during which time 16 cc. of water was collected. The reaction mixture then was cooled and filtered to remove a small amount of solid material. The filtrate, which comprised about 59% by weight solution of active material in xylene, was recovered in an amount of 1362 grams, which corresponds to a yield of 94% of theoretical. A small portion of the solution was stripped of solvent and recovered as a dark, brittle glass. Analysis showed a basic equivalent weight of 433 g. which corresponds to the theoretical equivalent weight of 428.5 g.

The salt of this example is the mono-salt and was prepared by mixing at room temperature 357 g. (0.494 basic equivalents) of the reaction product solution in xylene, prepared as described above, and 145 g. (0.247 acid equivalents) of di-(oxyethylenated nonylphenol) phosphate, containing an average of 4 oxyethylene groups per each nonylphenyl group. The reaction was mildly exothermic and the reaction mixture then was warmed on a steam bath with continued stirring. Following completion of the reaction, the reaction mixture was heated under vacuum to about 208° F. to remove the xylene solvent. The salt was recovered as a dark brown resin having a basic equivalent weight of 740 g. which corresponds to the theoretical basic equivalent weight of 724 g.

Example VI

The salt prepared as described in Example V is the mono-salt. The corresponding bis salt was prepared by reacting in substantially the same manner as described in Example V, 254 g. (0.351 basic equivalents) of the solution of the reaction product in xylene with 207 g. (0.351 acid equivalents) of the di-(oxyethylenated nonylphenol) phosphate. The resultant salt was recovered as a dark brown resin, having a basic equivalent weight of 1050 g., which corresponds to the theoretical equivalent weight of 1043 g.

Example VII

The salt of this example is the mono-substituted salt prepared by reacting mixed mono- and di-tridecyl acid orthophosphate with another portion of the reaction product prepared as described in Example V. This salt was prepared by mixing at room temperature 419 g. (0.579 basic equivalents) of the solution of reaction product in xylene with 108 g. (0.289 acid equivalents) of mixed mono- and di-tridecyl acid orthophosphate, followed by warming on a steam bath and vacuum distillation to remove the solvent in substantially the same manner as described in Example V. The salt was recovered as a dark brown resin, having a basic equivalent weight of 627 g. which corresponds to the theoretical basic equivalent weight of 616 g.

Example VIII

The bi-substituted salt corresponding to the mono-substituted salt of Example VII was prepared by mixing at room temperature 321 g. (0.443 basic equivalents) of the solution of reaction product in xylene and 166 g. (0.443 acid equivalents) of mixed mono- and di-tridecyl acid orthophosphate. The procedure was the same as described in Example V. The salt was recovered as a dark brown resin, having a basic equivalent weight of 817 g. which corresponds to the theoretical equivalent weight of 802 g.

Example IX

The salt of this example is prepared by reacting di-(oxyethylenated nonylphenol) phosphate, containing an average of 8 oxyethylene groups per each nonylphenyl group, with the reaction product prepared as described in Example I. The salt is prepared by intimately mixing, at room temperature, 67.4 g. (0.1 basic equivalent) of the reaction product, prepared as described in Example I, with 145 g. (0.1 acidic equivalent) of the di-(oxyethylenated nonylphenol) dithiophosphate, following which the mixture is heated on a steam bath with continued stirring.

Example X

The salt of this example is prepared by reacting mixed mono- and di-octyl acid orthophosphate with the reaction product of 1,4,5,6,7,7-hexachlorodicyclo-(2.2.1)-5-heptene-2,3-dicarboxylic acid, herein referred to as "Chlorendic" acid, and N,N-dicyclohexyl propanolamine. The reaction product is prepared by refluxing one mole proportion of "Chlorendic" acid with one mole proportion of N,N-dicyclohexyl propanolamine in the presence of xylene solvent. The refluxing is continued until the theoretical amount of water is collected, after which the xylene solvent is removed by distilling under vacuum. The salt is prepared by mixing and reacting one mole proportion of the resultant reaction product with two mole proportions of mixed mono- and di-octyl acid orthophosphate.

Example XI

The salt of this example is prepared by reacting di-(oxypropylenated dodecanol) phosphate, containing an average of 5 oxypropylene groups per each dodecyl group, with the reaction product of 5,6,7,8,9,9-hexachloro-1,2,3,4,4a,5,8,8a - octahydro - 1,4,5,8 - dimethano - 2,3 - naphthalenedicarboxylic acid, herein referred to as "B" acid and N,N-diamyl ethanolamine. The reaction product is prepared by refluxing one mole proportion of "B" acid and one mole proportion of N,N-diamyl ethanolamine in xylene solvent. The refluxing is continued until the theoretical amount of water is collected. In this preparation the xylene solvent is not removed but is retained as a solvent for ease in handling and in preparing the salt. The salt is prepared by commingling one mole proportion of the reaction product with two mole proportions of the di-(oxypropylenated dodecanol) phosphate and heated on a steam bath with intimate stirring. The salt is recovered as a homogeneous solution in the xylene solvent.

Eample XII

The salt of this example is prepared by mixing 15.8 g. (0.1 mole) of benzene phosphonic acid with 67.4 g. (0.05 mole) of the reaction product prepared as described in Example I.

Example XIII

The salt of this example is prepared by mixing 14.2 g. of benzene phosphinic acid with 67.4 g. (0.05 mole) of the reaction product prepared as described in Example I. An exothermic reaction results. In order to complete the formation of the salt, the reaction mixture is heated on a steam bath with intimate stirring for an additional 2 hours.

Example XIV

As hereinbefore set forth, the addition reaction products of the present invention are of especial utility as additives in lubricating oil. One method of evaluating lubricating oils is by the Falex machine. This procedure is described in detail in a book entitled "Lubricant Testing" authored by E. G. Ellis and published by Scientific Publications (Great Britain) Limited, 1953, pp. 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. The machine was operated for five minutes each at 250 and 500 pound loads and then forty-five minutes at 750 pound load. The data collected includes the temperature of the oil and the torque at each of the loads, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for five minutes at each load from 250 pounds to seizure at 250 pound increments. The maximum load and time in minutes at this load to seizure are reported, as well as the temperature of the oil. In this case the higher temperature is preferred because it means that the oil is operating satisfactorily at a higher tmeperature.

The lubricating oil used in this example is dioctyl sebacate synthetic lubricating oil marketed under the trade name of "Plexol 201."

Run No. 1 in the following tablet is a run made using the "Plexol" not containing an additive and thus is the blank or control run.

Run No. 2 is a run made using another sample of the "Plexol" to which has been added 2% by weight of the salt prepared as described in Example I.

Run No. 3 is a run made using another sample of the "Plexol" to which has been added 2% by weight of the salt prepared as described in Example II.

TABLE 1

| Run No. | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 1 | 150 | 231 | 490-S | 3-4 | 9-10 | 18-S | 0 | 0 | S | 750 | 2 | 490 |
| 2 | 170 | 275 | 363 | 5-6 | 13-16 | 17-20 | 0 | 0 | 25 | 1,425 | <0.1 | 450 |
| 3 | 168 | 280 | 368 | 4-5 | 14-16 | 19-21 | 0 | 0 | 21 | 1,425 | <0.1 | 440 |

S—Seizure.

From the data in the above table, it will be seen that the dioctyl sebacate without additive (Run No. 1) underwent seizure at a load of 750 pounds. In contrast, seizure conditions for the samples of the dioctyl sebacate containing the additives of the present invention was 1425 pounds.

Example XV

Another series of evaluations were made in the same manner as described in Example XIV, except that the lubricating oil was a mineral oil marketed commercially by A. H. Carnes Company as "Carnes 340 White Oil." Typical specifications of this oil include the following:

Distillation range, °F. _____ 740–975
Specific gravity at 60° F. _____ 0.8836
Viscosity at 100° F. _____ 360
Viscosity at 210° F. _____ 52.2
Flash point, COC, °F. _____ 440
Pour point, °F. _____ −20
Refractive index at 68° F. _____ 1.4805
Saybolt color _____ +30

Run No. 4 in the following table is a run using the white oil not containing an additive and thus is the blank or control run.

Run No. 5 is a run using another sample of the white oil to which has been added 2% by weight of the salt prepared as described in Example I.

Run No. 6 is a run made using another sample of the white oil to which has been added 2% by weight of the salt prepared as described in Example II. In order to facilitate solubility of the salt in the oil, nonylphenol was utilized as a mutual solvent.

TABLE II

| Run No. | Temperature, °F. 250 | Temperature, °F. 500 | Temperature, °F. 750 | Torque, lbs. 250 | Torque, lbs. 500 | Torque, lbs. 750 | Wear, Teeth 250 | Wear, Teeth 500 | Wear, Teeth 750 | Seizure Conditions Load | Seizure Conditions Time | Seizure Conditions Temperature, °F. |
|---|---|---|---|---|---|---|---|---|---|---|---|---|
| 4 | 172 | 350-S | ---------- | 5-6 | 30-S | ---------- | 0 | S | ---------- | 425 | <0.1 | 275 |
| 5 | 155 | 268 | 460 | 4-5 | 13-16 | 19-45 | 0 | 0 | 72 | 1,000 | 0.6 | 413 |
| 6 | 160 | 283 | 375 | 4-6 | 15-16 | 19-22 | 0 | 1 | 28 | 1,000 | 1-5 | 438 |

S—Seizure.

Here again, it will be seen that the oil without additive (Run No. 4) underwent seizure at a small load which, in this case, was 425 pounds. In contrast, the white oil containing the additives of the present invention did not undergo seizure until a load of 1000 pounds.

Example XVI

Another series of evaluations were made in the same manner as described in Example XIV using the salt prepared as described in Examples V and VI. The lubricating oil used in this series of evaluations is a commercial SAE #90 differential oil free of additives. The results of these evaluations are reported in the following table.

Run No. 7 is a run using the SAE #90 oil free of additives and therefore is the blank or control run.

Run No. 8 is a run which was made using another sample of the SAE #90 oil to which has been added 10% by weight of the salt prepared as described in Example V. In order to improve solubility, nonylphenol was utilized as a mutual solvent.

Run No. 9 is a run which was made using another sample of the SAE #90 oil to which has been added 10% by weight of the salt prepared as described in Example VI. Here again, nonylphenol was utilized as a mutual solvent.

TABLE III

| Run No. | Temperature, °F. 250 | Temperature, °F. 500 | Temperature, °F. 750 | Torque, lbs. 250 | Torque, lbs. 500 | Torque, lbs. 750 | Wear, Teeth 250 | Wear, Teeth 500 | Wear, Teeth 750 | Seizure Conditions Load | Seizure Conditions Time | Seizure Conditions Temperature, °F. |
|---|---|---|---|---|---|---|---|---|---|---|---|---|
| 7 | 177 | 280-S | ---------- | 6-7 | S | ---------- | 0 | S | ---------- | 500 | 0.1 | 280 |
| 8 | 163 | 268 | 326 | 5-7 | 13-16 | 18-22 | 0 | 0 | 2 | 1,750 | 2.0 | 600 |
| 9 | 165 | 271 | 380 | 4-5 | 13-16 | 19-24 | 0 | 0 | 0 | 2,000 | 0.25 | 675 |

S—Seizure.

From the data in the above table, it will be seen that these additives were exceptionally effective in imparting extreme pressure properties to the oil. The loads were increased from 500 pounds to 1750 and 2000 pounds. As mentioned previously nonylphenol was used as a mutual solvent. When evaluated by itself, nonylphenol had substantially no effect in increasing the load before seizure and therefore served only for the purpose of solubilizing these salts in the oil.

Example XVII

The salts prepared as described in Examples VII and VIII also were evaluated in the same oil and in the same manner as described in Example XVI.

A sample of the oil containing 10% by weight of the additive prepared as described in Example VII increased the load to 1250 pounds. The sample of oil containing 10% by weight of the additive prepared as described in Example VIII also increased the load to 1250 pounds. Here again, nonylphenol was added as a mutual solvent.

Example XVIII

The salt prepared as described in Example VI is used in a concentration of 1% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 248° F., and then the grease is further cooled slowly to room temperature.

The stability of the grease is tested in accordance with ASTM D-942 method, in which method a sample of the grease is placed in a bomb and maintained at a temperature of 212° F. Oxygen is charged to the bomb, and the time required for a drop of five pounds pressure is taken as the Induction Period. A sample of the grease without additive will reach the Induction Period in about eight hours. On the other hand, a sample of the grease containing 1% by weight of the additive of the present invention will be of substantially higher stability.

Example XIX

An insecticidal composition is prepared by dissolving 1 g. of the salt of Example XIII in 2 cc. of benzene and emulsifying the resultant solution with 100 cc. of water using Triton X–100 as the emulsifying agent. The resulting emulsion is sprayed into a cage containing houseflies and results in substantial knockdown.

I claim as my invention:

1. Salt of a phosphorus compound selected from the group consisting of phosphate, phosphinate, phosphonate and thio derivatives thereof with the reaction product, formed at a temperature of from about 175° F. to about 500° F., of one mole proportion of a compound selected from the group consisting of polyhalopolyhydropolycyclicdicarboxylic acid, anhydride and ester of said acid with from one to two mole proportions of an alkanolamine containing only one each of hydroxyl and amino groups, and said acid having the structural formula:

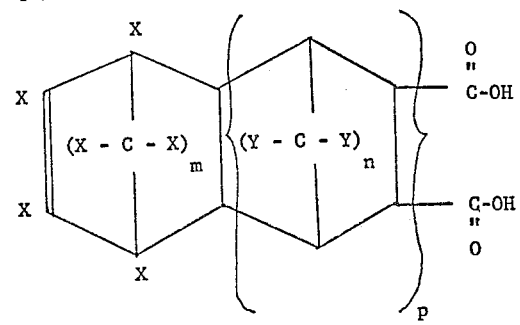

in which X is selected from the group consisting of chlorine, bromine, hydrogen and alkyl of from 1 to 10 carbon atoms, at least two of the X's being chlorine or bromine, Y is selected from the group consisting of chlorine, bromine, hydrogen and alkyl of from 1 to 10 carbon atoms, $m$ is an integer of from 1 to 4, $n$ ranges from zero to 4, and $p$ ranges from zero to 4.

2. The salt of claim 1 wherein said polyhalopolyhydropolycyclicdicarboxylic acid is 5,6,7,8,9,9-hexachloro-1,2,3,4,4a,5,8,8a - octahydro - 5,8 - methano - 2,3 - naphthalenedicarboxylic acid.

3. The salt of claim 1 wherein said polyhalopolyhydropolycyclicdicarboxylic anhydride is 5,6,7,8,9,9-hexachloro-1,2,3,4,4a,5,8,8a - octahydro - 5,8 - methano - 2,3 - naphthalenedicarboxylic anhydride.

4. The salt of claim 1 wherein said polyhalopolyhydropolycyclicdicarboxylic acid is 5,6,7,8,9,9-hexachloro-1,2,3, 4,4a,5,8,8a - octahydro - 1,4,5,8 - dimethano - 2,3 - naphthalenedicarboxylic acid.

5. The salt of claim 1 wherein said polyhalopolyhydropolycyclicdicarboxylic anhydride is 5,6,7,8,9,9-hexachloro-1,2,3,4,4a,5,8,8a - octahydro - 1,4,5,8 - dimethano - 2,3 - naphthalenedicarboxylic anhydride.

6. The salt of claim 1 wherein said polyhalopolyhydropolycyclicdicarboxylic acid is 1,4,5,6,7,7-hexachlorodicyclo-(2.2.1)-5-heptene-2,3-dicarboxylic acid.

7. The salt of claim 1 wherein said alkanolamine is N,N-di-substituted alkanolamine.

8. The salt of claim 1 wherein said alkanolamine is N,N-dialkyl alkanolamine.

9. The salt of claim 1 wherein said alkanolamine is N,N-diethyl ethanolamine.

10. The salt of claim 1 wherein said alkanolamine is N,N-dicycloalkyl alkanolamine.

11. The salt of claim 1 wherein said alkanolamine is N,N-dicyclohexyl ethanolamine.

12. The salt of claim 1 wherein said phosphate is di-(oxyalkylenated alkylphenol) phosphate.

13. The salt of claim 1 wherein said phosphate is di-(oxyalkylenated alkylphenol) dithiophosphate.

14. The salt of claim 1 wherein said phosphate is dialkyl acid orthophosphate.

No references cited.

CHARLES B. PARKER, *Primary Examiner.*

A. H. SUTTO, *Assistant Examiner.*